(12) United States Patent
Ruemelin

(10) Patent No.: US 12,086,318 B2
(45) Date of Patent: Sep. 10, 2024

(54) OPERATING DEVICE HAVING ACTIVE AND PASSIVE HAPTICS AND STEERING DEVICE HAVING SUCH AN OPERATING DEVICE

(71) Applicant: Bayerische Motoren Werke Aktiengesellschaft, Munich (DE)

(72) Inventor: Sonja Ruemelin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 35 days.

(21) Appl. No.: 17/918,624

(22) PCT Filed: Apr. 12, 2021

(86) PCT No.: PCT/EP2021/059390
§ 371 (c)(1),
(2) Date: Oct. 13, 2022

(87) PCT Pub. No.: WO2021/209362
PCT Pub. Date: Oct. 21, 2021

(65) Prior Publication Data
US 2023/0143530 A1    May 11, 2023

(30) Foreign Application Priority Data
Apr. 14, 2020    (DE) ...................... 10 2020 110 153.8

(51) Int. Cl.
*G06F 3/01*    (2006.01)
*B62D 1/04*    (2006.01)
(Continued)

(52) U.S. Cl.
CPC ............. *G06F 3/016* (2013.01); *B62D 1/046* (2013.01); *G06F 3/03547* (2013.01);
(Continued)

(58) Field of Classification Search
CPC ....... G06F 3/03547; G06F 2203/04809; G06F 3/016; G06F 3/0488; G06F 3/041;
(Continued)

(56) References Cited

U.S. PATENT DOCUMENTS 6,473,069 B1 * 10/2002 Gerpheide .......... G06F 3/03547
345/157
10,795,463 B2 * 10/2020 Cherney ............... G06F 3/0414
(Continued)

FOREIGN PATENT DOCUMENTS

DE    10 2012 020 164 A1    4/2014
WO    WO 2015/105906 A2    7/2015
WO    WO-2018118013 A1 *    6/2018    ............. G06F 3/033

OTHER PUBLICATIONS

International Search Report (PCT/ISA/210) issued in PCT Application No. PCT/EP2021/059390 dated Jul. 9, 2021 with English translation (five (5) pages).
(Continued)

*Primary Examiner* — Koosha Sharifi-Tafreshi
(74) *Attorney, Agent, or Firm* — Crowell & Moring LLP

(57) ABSTRACT

An operating device includes a touchpad having an operating surface for detecting touch inputs, which operating surface has multiple regions which are delimited from each other at least in part by one or more structural elements, each structural element being designed to have a first haptic effect on a finger when the finger swipes over the structural element; and a haptic actuator which is designed to have a second haptic effect which enhances the first haptic effect on the finger when the finger touches or swipes over a structural element. The operating device has a first operating mode in which the actuator is activated to produce the second haptic effect on the finger when the finger touches or swipes over a structural element, and a second operating mode in which
(Continued)

the actuator is deactivated when the finger touches or swipes over a structural element.

13 Claims, 3 Drawing Sheets

(51) Int. Cl.
    *G06F 3/0354*         (2013.01)
    *G06F 3/041*          (2006.01)
    *G06F 3/0485*         (2022.01)
    *G06F 3/0488*         (2022.01)
    *B60K 35/10*          (2024.01)

(52) U.S. Cl.
    CPC ............ *G06F 3/041* (2013.01); *G06F 3/0485* (2013.01); *G06F 3/0488* (2013.01); *B60K 35/10* (2024.01); *B60K 2360/139* (2024.01); *B60K 2360/1434* (2024.01); *G06F 2203/04806* (2013.01)

(58) Field of Classification Search
    CPC ................ G06F 3/04883; B60K 35/00; B60K 2360/1434; B60K 35/25
    See application file for complete search history.

(56) References Cited

U.S. PATENT DOCUMENTS

| | | | |
|---|---|---|---|
| 2009/0128503 A1 | 5/2009 | Grant et al. | |
| 2011/0043468 A1* | 2/2011 | Lathrop | G06F 3/04883 |
| | | | 345/173 |
| 2012/0256862 A1* | 10/2012 | Wagner | G06F 3/048 |
| | | | 345/173 |
| 2012/0268412 A1 | 10/2012 | Cruz-Hernandez et al. | |
| 2013/0249802 A1* | 9/2013 | Yasutake | G06F 3/02 |
| | | | 345/168 |
| 2016/0195932 A1 | 7/2016 | Czelnik et al. | |
| 2016/0349847 A1* | 12/2016 | Sugiura | G06F 3/04886 |
| 2019/0369730 A1* | 12/2019 | Marchant | G06F 3/0488 |

OTHER PUBLICATIONS

German-language Written Opinion (PCT/ISA/237) issued in PCT Application No. PCT/EP2021/059390 dated Jul. 9, 2021 (nine (9) pages).

\* cited by examiner

OPERATING DEVICE HAVING ACTIVE AND PASSIVE HAPTICS AND STEERING DEVICE HAVING SUCH AN OPERATING DEVICE

BACKGROUND AND SUMMARY OF THE INVENTION

The invention relates to an operating device, to a steering device comprising the operating device, and to a vehicle comprising the steering device.

The use of a touchscreen or touchpad for operating a multifunction unit (MFU) incorporated/integrated in a vehicle is known from the prior art. The touchscreen or the touchpad is incorporated in the center console and its operation requires the driver of the vehicle to remove one hand from the steering wheel and to gaze at the touchscreen or touchpad. As a result, the driver may be distracted from his/her actual task, that of steering the vehicle.

In order that the driver is not distracted from steering the vehicle when operating the MFU via a touchpad provided in the center console, the operating surface of the touchpad may be provided with passive haptics. The latter should be understood to mean ridges, grooves or flanks which are fixedly impressed or imprinted in the operating surface and which bound a region of the operating surface configured as a key. A region of the operating surface configured as a key (referred to hereinafter as key) is assigned a specific function of the MFU and can be detected haptically by a finger passing over the operating surface. In order that the finger passing over the operating surface recognizes the delimitation of a key with certainty, the passive haptics must have a minimum height or depth. This may depend on the surface shape of the passive haptics (e.g. edge shape).

Aside from keys to which a specific function of the MFU is assigned, a region via which characters (letters, numbers) or gestures (scroll, swipe, zoom gestures) are input may also be provided on the operating surface. However, this region may be too small for the input of complicated characters (e.g. Chinese characters) and/or specific gestures (e.g. zoom gesture using two fingers). This is the case particularly if a plurality of keys are provided on the operating surface and the size of the operating surface is restricted to less than 15 $cm^2$ due to the space available for the touchpad. In this case, the input of complicated characters and specific gestures is facilitated or actually becomes possible in the first place if the entire operating surface is available for the input. However, this input is obstructed by the passive haptics configured for feeling the key delimitation.

The use of active haptics for haptically detecting delimitations is known from the prior art. When this technique is used, the electrostatic adhesion (friction) between finger and operating surface may be increased at the boundary between two operating surface regions (e.g. keys), which brings about a haptic effect in the finger. A haptic effect in the finger may also be brought about if the friction between finger and operating surface is artificially decreased by changing the amplitude of ultrasound waves generated in the operating surface. Active haptics have the advantage that they can be switched on or off as necessary. However, a haptic effect produced on the basis of active haptics, particularly in the case of touchpads having an operating surface that is smaller than 15 $cm^2$, is not always unambiguously perceptible.

The present invention is therefore based on the object of providing an operating device having an operating surface which makes it possible for a user to haptically detect regions that are provided on the operating surface and are separated from one another and to facilitate the input of gestures or complicated characters.

This object is achieved in accordance with the operating device of the claimed invention.

The present invention is furthermore based on the object of providing a steering device which makes it possible for the driver of a vehicle equipped with the steering device to operate a multifunction unit provided in the vehicle, without the driver removing a hand from the steering device.

This object is achieved in accordance with the steering device of the claimed invention.

The present invention is furthermore based on the object of providing a vehicle having a multifunction unit which is easy for the driver of the vehicle to operate.

This object is achieved in accordance with the vehicle of the claimed invention.

A first aspect of the invention relates to an operating device, comprising:
- a touchpad having an operating surface for detecting touch inputs made by a user using at least one finger;
- wherein the operating surface comprises a plurality of regions which are each delimited from one another at least piecewise by one or more structural elements, and each structural element is configured to have a first haptic effect on a finger when the finger passes over the structural element;
- a haptic actuator configured to have a second haptic effect on the finger, the second haptic effect intensifying the first haptic effect, when the finger touches or passes over a structural element;
- wherein the operating device has a first operating mode, in which the actuator is activated to produce the second haptic effect on the finger when the finger touches or swipes over a structural element, and
- has a second operating mode, in which the actuator is deactivated when the finger touches or passes over a structural element.

As a result, the structural elements (the passive haptics) can be configured such that they do not significantly obstruct the input of characters or gestures using the entire operating surface (i.e. all regions of the plurality of regions) and are nevertheless haptically detectable/recognizable by the user.

The regions of the plurality of regions are pairwise disjoint. A touch input can be made by touching or passing over the operating surface. In order that touching or passing over the operating surface is detected as a touch input, it may be necessary that the touching or passing over the operating surface must last for a predefined time duration. When touching or passing over the operating surface, the finger may come into contact with a structural element. The latter may in this case have the first haptic effect on the finger. However, this first haptic effect may be so small that on the basis solely of the first haptic effect, the user cannot infer with certainty having touched or passed over a structural element.

The expressions "encompasses", "contains", "includes", "comprises", "has", "having", or any other variant thereof, as used herein, are intended to cover a non-exclusive inclusion. In this regard, for example, a device which encompasses or comprises a list of elements is not necessarily restricted to these elements, but rather may include other elements that are not expressly listed or are inherent to such a method or such a device.

Furthermore, "or", unless expressly indicated to the contrary, relates to an inclusive "or" rather than an exclusive "or". For example, a condition A or B is met by one of the following conditions: A is true (or present) and B is false (or not present), A is false (or not present) and B is true (or present), and both A and B are true (or present).

The terms "a/an" or "one", as used herein, are defined in the sense of "one or more". The terms "another" and "a further" and also any other variant thereof should be understood in the sense of "at least one further".

Preferred embodiments of the operating device are described below, which embodiments can in each case be combined in any desired way with one another and also with the further described other aspects of the invention, provided that this is not expressly excluded or is technically impossible.

In one preferred embodiment, the haptic actuator is designed to achieve the second haptic effect on the basis of at least one of the following: changing the electrostatic adhesion between operating surface and finger, changing the amplitude of ultrasound waves generated in the operating surface.

As a result, the haptic effect of the structural elements (forming the passive haptics) can be efficiently and sufficiently intensified. In particular, it is thereby possible to change the friction between operating surface and finger at the boundary between two regions and thus to achieve an actively haptic effect (feedback) on the finger touching the boundary.

In one preferred embodiment, a structural element is configured as one of the following: an elevation, a groove, a flank.

As a result, the structural elements can be realized efficiently.

An elevation, groove or flank forming a structural element is embodied permanently on the operating surface. An elevation can be configured as a ridge and a depression can be configured as a groove. A structural element configured as a ridge can be printed onto the operating surface of the touchpad and a structural element configured as a groove can be impressed into the operating surface. The height of a ridge or the depth of a groove can be in the range of between 0.2 mm and 0.3 mm. The width of a ridge or groove can be in the range of between 0.2 mm and 0.5 mm. The edges touchable by a finger can be angular or rounded. In the case of two regions delimited by way of a flank, at least the surfaces of the regions that adjoin the flank are spatially offset with respect to one another. The height of the flank can be in the range of between 0.2 mm and 0.3 mm and its steepness can be in the range of between 60 degrees and 90 degrees.

In one preferred embodiment, the operating surface comprises a first operating surface section and a second operating surface section,
  the first operating surface section contains one region or a plurality of regions of the plurality of regions which is/are arranged successively along an edge section of the operating surface, and
  the second operating surface section contains one region of the plurality of regions which is delimited from the region(s) of the first operating surface section by one continuous structural element or a plurality of individual structural elements.

As a result, the haptic detection of a specific region can be facilitated. By way of example, the second region of the first operating surface section, the second region being configured as a key, can be haptically determined/found: by a procedure in which the user firstly feels the edge section of the first operating surface section, proceeding from the latter and using the finger passes over the first region of the first operating surface section and the structural element separating the first region from the second region, and finally reaches the second region. The region of the second operating surface section can also easily be found haptically. For example by a procedure in which the user firstly feels the edge section of the first operating surface section, proceeding from the latter and using the finger passes over a region of the first operating surface section and the structural element separating the region of the first operating surface section from the region of the second operating surface section, and finally reaches the region of the second operating surface section.

The operating surface can substantially have the shape of a polygon, and the edge section of the operating surface can contain one or more sides of the polygon. The edge section of the operating surface along which the regions of the first operating surface section are arranged can be embodied differently than the remaining edge section of the operating surface, such that the two edge sections are haptically distinguishable from one another.

In one preferred embodiment, the haptic actuator is configured, in the first operating mode, to have a second haptic effect on the finger which, in combination with the first haptic effect, produces a resulting haptic effect in the finger which unambiguously allows the fact of the finger touching or passing over a structural element to be deduced.

As a result, a user can make an operating input using the operating device, without having to gaze at the operating device and without being distracted from some other activity (e.g. steering a vehicle). As a result, the operating device is suitable in particular for operating a multifunction unit integrated in a vehicle.

In one preferred embodiment, each structural element is configured not to obstruct a touch input by touching or passing over a plurality of regions.

As a result, the input of a Chinese or Japanese character or a zoom gesture using two fingers can be facilitated or made possible in the first place, particularly if the operating surface is small relative to a fingertip (e.g. smaller than 15 $cm^2$).

In one preferred embodiment, each region of the plurality of regions is individually illuminable.

As a result, the operating device can also be used at night.

A second aspect of the invention relates to a steering device for a vehicle, comprising:
  a first steering unit having a first handle for at least one-handed actuation of the steering device by a user steering the vehicle; and
  an operating device according to the invention, wherein the first handle and the operating surface are arranged relative to one another such that their relative position with respect to one another does not change when the steering device is actuated.

As a result, the user (driver) of a vehicle provided with the steering device, during the steering of the vehicle, can haptically find the regions provided on the operating surface using a finger, and can make operating inputs, without having to remove the hand from the first handle for this purpose, and without being significantly distracted from steering.

Preferably, a gripping position for a hand of the user is provided on the first handle and the operating device is arranged in proximity to the gripping position such that the operating surface of the operating device is touchable or able to be passed over by a hand gripping the gripping position, in particular using a finger of this hand. The steering device can be configured as one of the following: steering horn, handlebar (e.g. of a bicycle/motorcycle), joystick, steering wheel (e.g. of an automobile).

One preferred embodiment comprises:
- a transverse element, which is mountable in the vehicle rotatably about a steering axis of the vehicle; and
- a second steering unit having a second handle for at least one-handed actuation of the steering device by the user steering the vehicle;
- wherein the first steering unit is arranged at a first end of the transverse element and the second steering unit is arranged at a second end of the transverse element;
- the two steering units are arranged mirror-symmetrically in relation to a plane of symmetry of the steering device, the plane of symmetry containing the steering axis;
- each of the two steering units is arranged in a manner mounted on the transverse element rotatably about a respective rotation axis. Preferably, the two rotation axes and the steering axis are parallel to one another.

As a result, the driver can also use the second hand for steering the vehicle.

A gripping position for the other hand of the driver can be provided on the second handle. A further operating device can be arranged in proximity to this gripping position such that the operating surface of the further operating device is touchable or able to be passed over by a hand gripping this gripping position, in particular using a finger of this hand. The first handle and/or the second handle can adopt an upstanding position upon actuation of the steering device, at any steering angle. The transverse element is preferably configured for mounting on the steering column of the vehicle.

A third aspect of the invention relates to a vehicle, comprising:
- a steering device according to the invention, which is connected to a steering column of the vehicle or to a corresponding element of a steer-by-wire steering system; and
- a multifunction unit (MFU) for performing one or more functions, which is communicatively coupled to the operating device;
- wherein one function is operable by the operating device, by way of a touch input made using at least one finger; and
- the operating device is able to be put either into the first operating mode or into the second operating mode depending on the function to be operated.

As a result, the MFU of the vehicle can be operated more easily, without the driver having to release the steering device, and without the driver having to direct his/her gaze away from the roadway and toward the operating surface, so that overall the driver is not significantly distracted from steering the vehicle.

The operating device can provide an operating signal corresponding to the detected touch input. The MFU can receive this signal and operate a function (performed by it) on the basis of the received signal. The MFU can provide a control signal for controlling the actuator provided on the operating device. This providing can be effected depending on a function not be operated (by the operating device). The operating device can receive the control signal and, on the basis thereof, activate or deactivate the actuator, and thus put the operating device into the first operating mode or the second operating mode. Operating signals and control signals can be transmitted between the operating device and the MFU in a wired or wireless manner.

In one preferred embodiment, if the operating device is in the first operating mode, exactly one region is assigned to a first function, and this function is operable only by touching or passing over the region assigned to it; and
if the operating device is in the second operating mode, a plurality of regions are assigned to a second function, and this function is operable by touching or passing over at least one of these regions.

As a result, even a character for which the space provided by a region of the operating surface is not sufficient to allow the character to be input using the finger can be input by touching and/or passing over a plurality of regions of the operating surface.

In one preferred embodiment, at least two of the plurality of regions assigned to the second function are adjacent.

As a result, the input of a Chinese character, a swipe gesture, a scroll gesture and a zoom gesture can be significantly facilitated.

In one preferred embodiment, the region of the second operating surface section and also at least one region of the first operating surface section are assigned to the second function; and
the multifunction unit is configured to put the operating device into the second operating mode before performing the second function.

As a result, it is possible to implement the inputting of characters or gestures by touching and/or passing over a plurality of regions of the operating surface.

In one preferred embodiment, the first function comprises one of the following:
- the inputting of characters,
- a scroll gesture using at least one finger,
- a swipe gesture using at least one finger, and
- a zoom gesture using two fingers.

As a result, a function can be operated more conveniently.

In one preferred embodiment, individual or all regions of the plurality of regions are individually illuminable, and the illumination of each illuminable region depends on the function assigned thereto.

As a result, the functions can also be operated at night.

Further advantages, features and possibilities for application of the present invention will become apparent from the following detailed description in association with the figures.

BRIEF DESCRIPTION OF THE DRAWINGS

FIG. 1b schematically shows a sectional view at the location A-A of FIG. 1a.

FIG. 2b schematically shows a sectional view at the location B-B of FIG. 2a.

FIG. 3b schematically shows a sectional view at the location C-C of FIG. 3a.

DETAILED DESCRIPTION OF THE DRAWINGS

The same reference signs are used throughout the figures for the same or mutually corresponding elements of the invention.

Figure 1A:
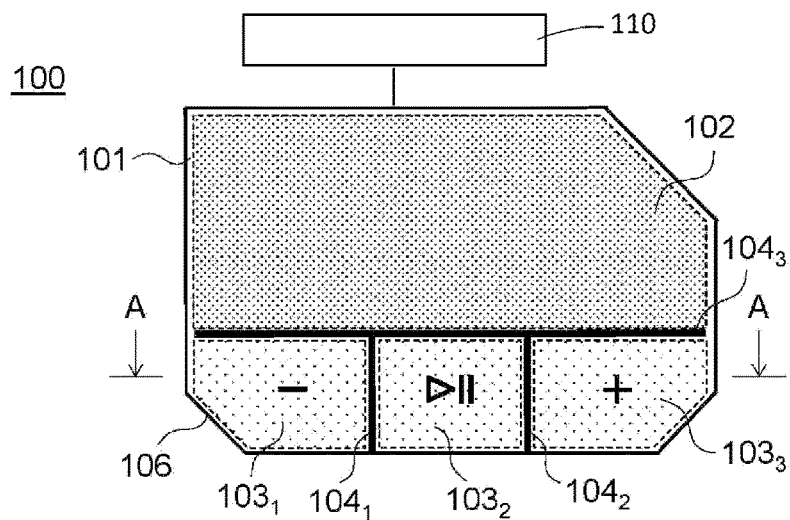
FIG. 1a schematically shows an operating device in accordance with a first embodiment.
Figure 1B:
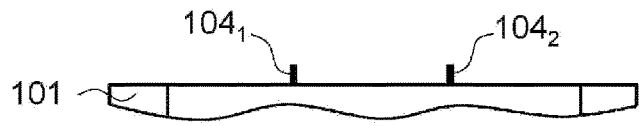

FIG. 1*a* schematically shows a plan view of an operating device in accordance with a first embodiment of the present invention and FIG. 1*b* schematically shows an excerpt from the sectional view at the location A-A in FIG. 1*a*. The operating device in accordance with the first embodiment 100 comprises: a touchpad 101 and a haptic actuator 110. The touchpad 101 has an operating surface, on which a user can make touch inputs using at least one finger, and is configured to detect the touch inputs made using the finger. An operating surface comprises a plurality of disjoint regions, 102, 103$_1$ . . . 103$_3$, which are each delimited from one another at least piecewise by one or more structural elements, 104$_1$ . . . 104$_3$. Each structural element is configured to have a first haptic effect on a finger when the finger passes over the structural element. The haptic effect that a structural element has on the finger may be so weak that, solely on the basis of this haptic effect, the user is not certain whether his/her finger is touching or passing over a structural element, and the user thus cannot infer the presence of a structural element either.

Advantageously, the structural elements 104$_1$, 104$_2$ and 104$_3$ are embodied as ridges and configured in such a way that they do not (significantly) obstruct a touch input using the finger, by way of touching or passing over a plurality of regions. The height of the ridges can be in a range of 0.2 mm to 0.3 mm, and their width can be in a range of 0.2 mm to 0.5 mm. The height and width may depend on the edge radii of the edges being touched by the finger. The ridges 104$_1$ to 104$_3$ are fixedly impressed into the operating surface or are printed onto the latter.

The haptic actuator 110 is configured to have a second haptic effect on the finger, the second haptic effect intensifying the first haptic effect, when the finger touches or passes over one of the structural elements, 104$_1$ . . . 104$_3$. The second haptic effect can be achieved on the basis of at least one of the following methods: i) changing the electrostatic adhesion between operating surface and finger; ii) changing the amplitude of ultrasound waves generated on the surface of the operating surface.

In accordance with method i), an electrostatic field is generated between the finger and the operating surface, and is increased in the course of touching or passing over predefined locations of the operating surface, and the friction (electrostatic adhesion) between finger and operating surface is thus increased at these locations. The increased friction between finger and operating surface is perceived haptically by the user when passing over the operating surface using the finger. A haptic actuator that works according to method i) accordingly intensifies the haptic effect that a ridge has on the finger by virtue of the haptic actuator increasing the electrostatic adhesion between finger and operating surface when the finger passes over the ridge.

In accordance with method ii), ultrasound waves are generated on the surface of the operating surface, and the amplitude of the waves is altered in the course of touching or passing over predefined locations of the operating surface, which influences the friction between finger and operating surface. By way of example, an increase in the amplitude may decrease the friction between finger and operating surface. The implementing or integrating of a haptic actuator into a touchpad is known to the person skilled in the art, and so will not be discussed any further.

The operating device 100 has a first operating mode and a second operating mode. In the first operating mode, the haptic actuator is activated and produces the second haptic effect when the finger touches and/or passes over a structural element. The user perceives a resulting haptic effect that is a combination of the first haptic effect and the second haptic effect. The resulting haptic effect allows the user to unambiguously deduce the fact of the finger touching or passing over a structural element. In the second operating mode, the haptic actuator is deactivated, and the user can only perceive the first haptic effect caused by the ridge.

The regions present on the operating surface are each assigned to a function in the first operating mode, and the function assigned to a region can only be operated by touching and/or passing over the respective region. The functions to be operated via the operating device 100 may be functions of a multifunction unit incorporated in a vehicle. Examples of functions are: reducing volume, station search, increasing volume, and detecting characters. In FIG. 1*a*, the first three functions were assigned to the regions 103$_1$, 103$_2$, 103$_3$ and detecting characters was assigned to the region 102. Regions whose assigned functions are operable by simple touching (tapping), such as the regions 103$_1$, 103$_2$ and 103$_3$, for example, can be combined to form a first operating surface section. Regions whose assigned functions are substantially operable by passing over the region, such as the region 102, for example, can be combined to form a second operating surface section. The second operating surface section of the operating device 100 contains only one region, the region 102.

Advantageously, the regions of the first operating surface section are arranged successively in a predefined order along the edge section 106 of the operating surface, and the region 102 (of the second operating surface section) is arranged above the regions, 103$_1$ . . . 103$_3$, in a manner separated from the latter by the ridge 104$_3$. Moreover, the surface of the edge section 106 bounding the regions of the first operating surface section can be configured such that it has a different haptic effect on a finger than the surface of the remaining edge of the operating surface. This arrangement of the regions affords a user of the operating device 100 the possibility of finding a specific region (key) of the operating surface haptically. By way of example, the user can feel the region 103$_2$ by proceeding from the edge section 106 and passing over the region 103$_1$ and the ridge 104$_1$.

The present invention is not restricted solely to the arrangement of the regions as shown in FIG. 1, but rather also encompasses arrangements in which: i) the regions of the first operating surface section are arranged above the region of the second operating surface section; ii) the region of the second operating surface section is surrounded by the regions of the first operating surface section; iii) the regions of the first operating surface section surround the region of the second operating surface section in a U- or L-shaped manner.

The region 102 may be too small for inputting Chinese characters or gestures. This may be the case in particular if the operating surface overall has a size of less than 15 cm$^2$ and comprises a plurality of regions of the first operating surface section. In order to facilitate or actually enable the input of these characters or gestures, the operating device 100 can be put into the second operating mode, and a character or a gesture can be input over the entire operating surface (or only selected regions thereof). By way of example, the user can begin with the touch input in the region 102 and, proceeding from the latter, pass over a plurality of regions and ridges. Since, in the second operating mode, the haptic actuator is deactivated and the haptic effect of the ridges on the finger is only weak, such inputs can take place in an unobstructed manner.

Each region of the plurality of regions, 102, $103_1$, . . . $103_3$, can be individually illuminable.

Figure 2A:
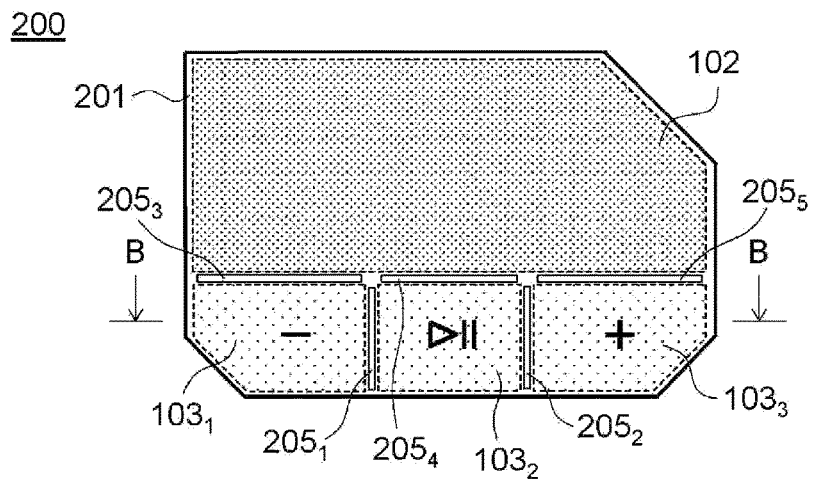
FIG. 2a schematically shows an operating device in accordance with a second embodiment.
Figure 2B:
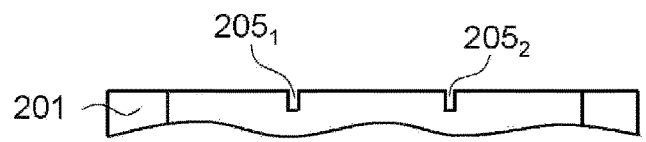

FIG. 2a schematically shows a plan view of an operating device in accordance with a second embodiment of the present invention and FIG. 2b schematically shows an excerpt from the sectional view at the location B-B in FIG. 2a. The operating device in accordance with the second embodiment, 200, differs from the operating device 100 in that the regions of the plurality of regions, 102, $103_1$ . . . $103_3$, are each delimited from one another at least piecewise by one or more grooves, $205_1$ . . . $205_5$. Each of these grooves is configured to have a first haptic effect on a finger when the finger passes over it, which first haptic effect may be so weak, however, that, solely on the basis of this haptic effect, the user is not certain whether his/her finger is passing over a groove. Advantageously, the grooves $205_1$ . . . $205_5$ are configured in such a way that they do not (significantly) obstruct a touch input using the finger, by touching or passing over a plurality of regions. The depth of the groove can be in a range of 0.2 mm to 0.3 mm, and its width can be in a range of 0.2 mm to 0.5 mm. The grooves are fixedly impressed into the operating surface.

In the first operating mode, the first haptic effect that a groove has on the finger is intensified by the second haptic effect produced by the haptic actuator. The user perceives a resulting haptic effect that unambiguously allows the fact of touching or passing over a groove to be deduced. The actuator can intensify the haptic effect that a groove has on the finger by generating ultrasound waves on the surface of the operating surface and, when the finger touches or passes over the groove, increasing the amplitude of the wave and thus decreasing the friction between finger and operating surface.

Figure 3A:
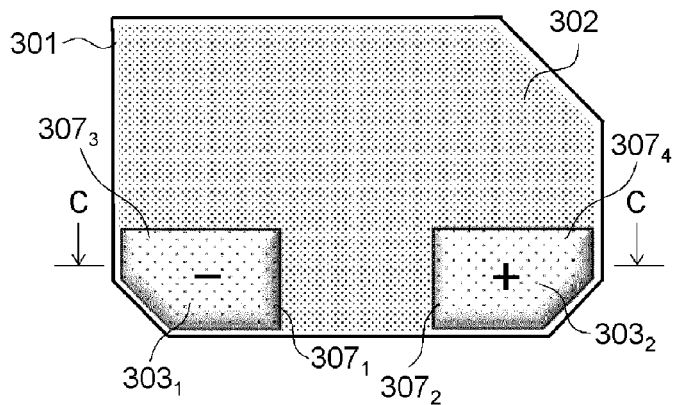
FIG. 3a schematically shows an operating device in accordance with a third embodiment.
Figure 3B:
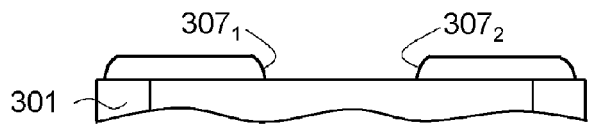

FIG. 3a schematically shows a plan view of an operating device in accordance with a third embodiment of the present invention and FIG. 3b schematically shows an excerpt from the sectional view at the location C-C in FIG. 3a. The operating device in accordance with the third embodiment, 300, differs from the operating device 100 in that it only comprises two regions of the first operating surface section, and these regions are each delimited from the region 302 by two flanks. The region $303_1$ is delimited from the region 302 by the flanks $307_1$ and $307_3$, and the region $303_2$ is delimited by the flanks $307_2$ and 3074. The surfaces of the regions $303_1$ and 302 delimited by the flank $307_1$ are (at least in very close proximity to the flank) at different heights. This unevenness causes the flank $307_1$ to have a first haptic effect on a finger when the finger passes over it. A similar situation applies to the flank $307_2$ and the surfaces of the regions $303_2$ and 302.

Advantageously, the flanks $307_1$ and $307_2$ are configured such that they do not obstruct a touch input using the finger, by touching or passing over a plurality of regions. The height of the flank can be in a range of 0.2 mm to 0.3 mm, and its gradient can be in a range of 0.2 mm to 0.5 mm. The flanks are fixedly impressed into the operating surface.

Figure 4:
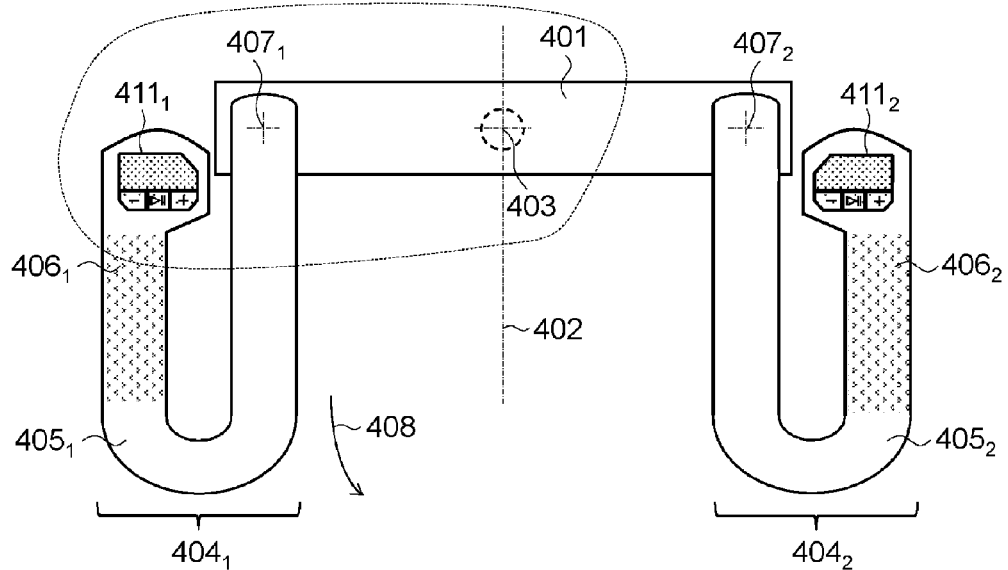
FIG. 4 schematically shows a steering device according to embodiments of the invention.

FIG. 4 schematically shows a steering device 400 according to embodiments of the invention. The steering device 400 can be provided for a vehicle having a multifunction unit (MFU), and comprises: a steering transverse body 401, a first steering unit $404_1$ and a second steering unit $404_2$. The steering transverse body 401, referred to hereinafter as transverse element 401, is configured for mounting on the steering column of a vehicle. By way of the transverse element 401 mounted on the steering column, the steering column can be rotated and steering of the vehicle can thus be performed.

The first steering unit $404_1$ is arranged in a manner mounted at one end of the transverse element 401 rotatably about a first rotation axis $407_1$ and comprises: a first handle $405_1$ for the actuation of the steering device 400 by a driver steering the vehicle, and a first operating device $411_1$ according to embodiments of the invention. The first handle $405_1$ and the first operating device $411_1$ are arranged relative to one another such that their relative position with respect to one another does not change upon actuation of the steering device. A first gripping position $406_1$ for the left hand of the driver is also provided on the first handle $405_1$. The first gripping position $406_1$ and the first operating device $411_1$ are arranged relative to one another such that the first operating device is operable by the hand gripping the first gripping position, in particular using a finger of this hand, without the hand having to leave the first gripping position for this purpose. Advantageously, as a result, the user (driver) of a vehicle provided with the steering device 400, during the steering of the vehicle, can haptically find the regions provided on the operating surface using a finger, and make operating inputs, without being significantly distracted from steering.

The second steering unit $404_2$ is arranged in a manner mounted at the other end of the transverse element 401 rotatably about a second rotation axis $407_2$ and comprises: a second handle $405_2$ for the actuation of the steering device 400 by the driver steering the vehicle, and a second operating device $411_2$ according to embodiments of the invention. The second handle $405_2$ and the second operating device $411_2$ are arranged relative to one another such that their relative position with respect to one another does not change during actuation of the steering device. A second gripping position $406_2$ for the right hand of the driver is also provided on the second handle $405_2$. The second gripping position $406_2$ and the second operating device $411_2$ are arranged relative to one another such that the second operating device is operable by the hand gripping the second gripping position, and particularly using a finger of this hand, without the hand having to leave the second gripping position for this purpose. Advantageously, as a result, a driver of a vehicle provided with the steering device 400 can use both hands for steering, and make operating inputs during the steering of the vehicle using both hands, without being significantly distracted from steering.

The steering device 400 is illustrated schematically in its zero position in FIG. 4. In the zero position of a steering device mounted on a steering column, the vehicle wheels to be steered are directed straight ahead, the first steering unit $404_1$ and the second steering unit $404_2$ are arranged mirror-symmetrically in relation to a plane of symmetry 402 containing the steering axis 303, and the first rotation axis $407_1$ and the second rotation axis $407_2$ are parallel to one another. A steering device 400 mounted on a steering column results in steering toward the left if the first handle $405_1$ and/or the second handle $405_2$ are/is actuated/moved in the direction of the arrow 408, and in steering toward the right if the first handle $405_1$ and/or the second handle $405_2$ are/is actuated/moved counter to the direction of the arrow 408. The actuation of one of the two handles $405_1$ and $405_2$ causes not only the rotation of the transverse element 401 and of the steering column connected thereto, but also a realignment of the handles 405₁ and 405₂, relative to the transverse element 401. This realignment of the handles and also the mechanical coupling between the handles which enables the realignment of the handles are not illustrated in the figures.

The first operating device 411₂ and/or the second operating device 411₂ are preferably arranged on a surface of the respective steering unit that faces the driver. As a result, each of the operating devices can be detected by the driver not only haptically but also visually.

A further steering device according to embodiments of the invention which is not illustrated in the figures, differs from the steering device 400 in that it comprises an operating device according to embodiments of the invention only on one of the two steering units.

Figure 5A:
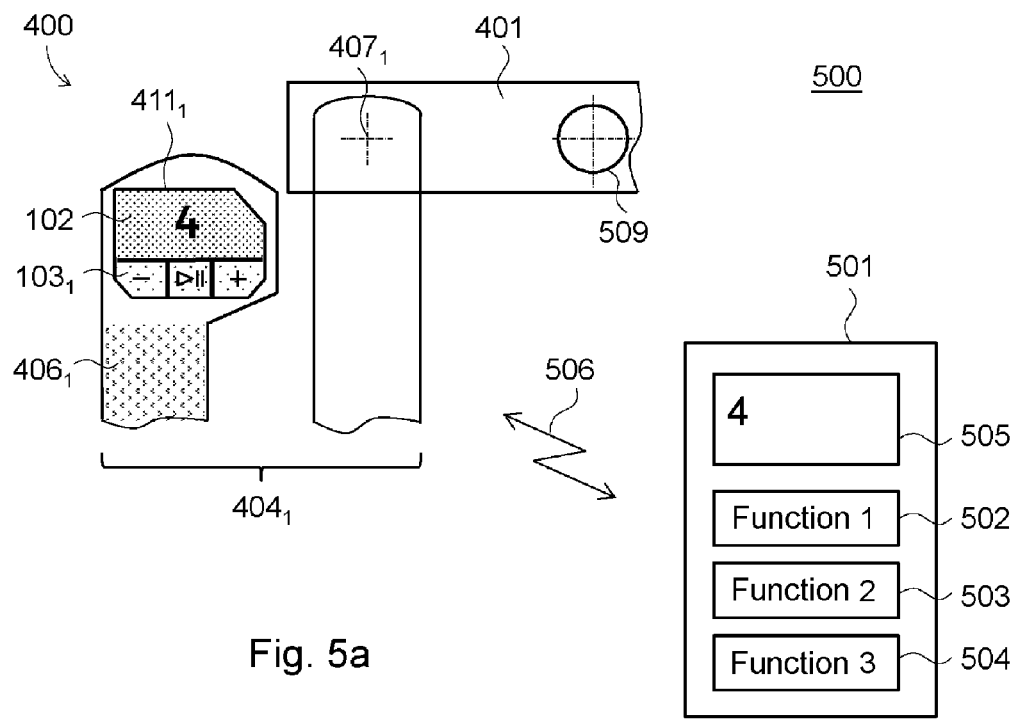
FIG. 5a schematically shows a steering device according to embodiments of the invention mounted in a vehicle according to embodiments of the invention, and a multifunction unit of the vehicle, the multifunction unit being communicatively connected to the operating device.

A vehicle according to embodiments of the invention comprises a steering device according to the invention and a multifunction unit (MFU). FIG. 5a schematically shows a steering device 400 according to embodiments of the invention mounted in the vehicle 500, and a multifunction unit 501 of the vehicle, which multifunction unit is communicatively connected 506 to the operating device 411₁ (of the steering device). In this case, FIG. 5a only illustrates that part of the steering device 400 which lies within the dashed line.

In the vehicle 500, the steering device 400 is connected to the steering column 509 of the vehicle or to a corresponding element of a steer-by-wire steering system. The MFU 501 can be integrated in the center console of the vehicle and have a display device 505. Touch inputs made by a user can be displayed on the display device. The MFU 501 has a plurality of functions, 502 . . . 504, which upon corresponding operation are activated by the MFU and performed by the latter. By way of example, the function 502 increases the volume of an audio signal, the function 503 detects a telephone number input by the user and displays it via the display device 505, and the function 503 detects a Chinese character and displays it.

Via the communicative coupling 506, which can be embodied as wired or wireless, the operating device 411₁ and the MFU 501 can exchange operating and control signals with one another. The operating device 411₁ and/or the MFU 501 are/is configured, on the basis of the exchanged operating and control signals: i) to operate functions of the MFU by way of touch inputs made on the operating device; and ii) to put the operating device into the first operating mode or into the second operating mode depending on a function to be operated.

Figure 5B:
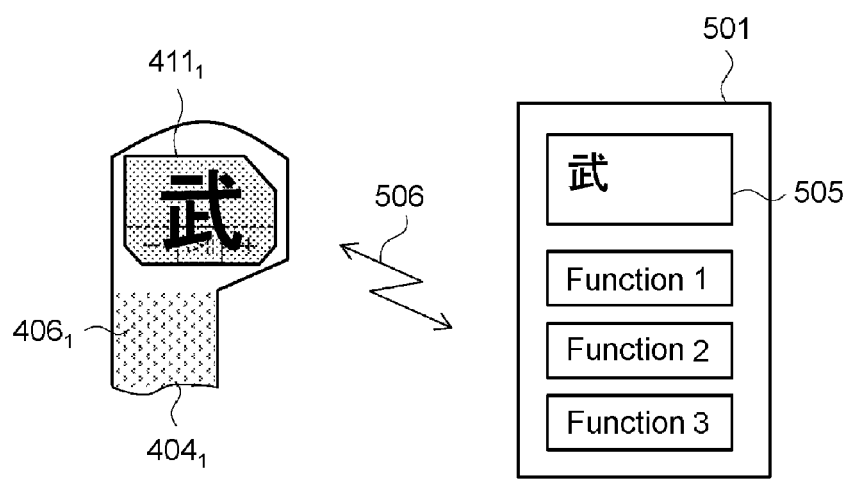
FIG. 5*b* schematically shows the inputting of characters into the multifunction unit via an operating device according to embodiments of the invention, in the second operating mode.

Advantageously, the MFU 501 and/or the operating device 411₁ are configured: in the first operating mode, to assign exactly one region to a function and to operate the latter only by touching or passing over this region; and in the second operating mode, to assign a plurality of regions to a function and to operate this function by touching or passing over at least one of these regions. By way of example, the region 103₁ could be assigned to the function 502 and the region 102 could be assigned to the function 503, and these functions could be operated in the first operating mode. All regions of the operating surface could be assigned to the function 504 and the operation thereof could take place in the second operating mode. The inputting of the digit of a telephone number (function 503) would accordingly take place in the second operating mode, by passing over the region 102. FIG. 5a indicates the input of the digit '4'. By contrast, the input of Chinese characters or gestures (function 504) would take place in the first operating mode, by touching or passing over one or more regions of the operating surface. FIG. 5B indicates the input of a Chinese character.

While at least one exemplary embodiment has been described above, it should be noted that a large number of variations thereon exist. It should also be noted that the exemplary embodiments described constitute merely non-limiting examples, and there is no intention thus to restrict the scope, the applicability or the configuration of the devices and methods described here. Rather, the above description gives the person skilled in the art instructions for implementing at least one exemplary embodiment, it being apparent that various modifications in the functioning and the arrangement of the elements described in an exemplary embodiment can be undertaken, without in so doing departing from the subject matter defined in each case in the appended claims and the legal equivalents thereof.

LIST OF REFERENCE SIGNS

100 Operating device
101 Touchpad having operating surface
102 Region of the second operating surface section
103₁ . . . 103₃ Regions of the first operating surface section
104₁ . . . 104₃ Structural elements/ridges
106 Edge section of the operating surface
200 Operating device
201 Touchpad having operating surface
205₁ . . . 205s Structural elements/grooves
300 Operating device
301 Touchpad having operating surface
302 Region of the second operating surface section
303₁, 303₂ Regions of the first operating surface section
307₁ . . . 3074 Structural elements/flanks
400 Steering device
401 Transverse element or steering transverse body
402 Plane of symmetry containing the steering axis
403 Steering axis
404₁, 404₂ Steering units
405₁, 405₂ Left and right handle, respectively
406₁, 406₂ Gripping position for left and right hand, respectively
407₁, 407₂ Rotation axes
411₁, 411₂ Operating devices
500 Operating and steering device in a vehicle
501 Multifunction unit
502 . . . 504 Functions of the multifunction unit
505 Display device
506 Communicative coupling
509 Steering column of a vehicle

The invention claimed is:

1. A vehicle comprising:
a steering device comprising:
   a first steering unit having a first handle for at least one-handed actuation of the steering device by a user steering the vehicle; and
   an operating device comprising:
     a touchpad having an operating surface for detecting touch inputs made by a user using at least one finger, wherein the operating surface comprises a plurality of regions which are each delimited from one another at least piecewise by one or more structural elements, and each structural element of the one or more structural elements is configured to have a first haptic effect on a finger of the at least one finger when the finger touches or passes over the structural element; and
a haptic actuator configured to have a second haptic effect on the finger, the second haptic effect intensifying the first haptic effect when the finger touches or passes over the structural element; and
a multifunction unit for performing one or more functions;
wherein the operating device has a first operating mode in which each structural element has the first haptic effect on the finger when the finger touches or passes over the structural element, and the haptic actuator is activated to produce the second haptic effect on the finger when the finger touches or passes over the structural element,
wherein the operating device has a second operating mode in which each structural element has the first haptic effect on the finger when the finger touches or passes over the structural element, and the haptic actuator is deactivated when the finger touches or passes over the structural element,
wherein the first handle and the operating surface are arranged relative to one another such that their relative position with respect to one another does not change when the steering device is actuated,
wherein the steering device is connected to a steering column of the vehicle or to a corresponding element of a steer-by-wire steering system,
wherein the multifunction unit is communicatively coupled to the operating device,
wherein one function of the one or more functions is operable by the operating device, by way of a touch input made using the at least one finger, and
wherein the operating device is able to be put either into the first operating mode or into the second operating mode depending on the one function to be operated.

2. The vehicle according to claim 1, wherein the haptic actuator is configured to achieve the second haptic effect based on at least one of: changing an electrostatic adhesion between the operating surface and the finger, or changing an amplitude of ultrasound waves generated in the operating surface.

3. The vehicle according to claim 1, wherein the structural element is configured as one of an elevation, a ridge, a groove, or a flank.

4. The vehicle according to claim 1, wherein:
the operating surface comprises a first operating surface section and a second operating surface section,
the first operating surface section contains one region or a subset of regions of the plurality of regions which are arranged successively along an edge section of the operating surface, and
the second operating surface section contains one region of the plurality of regions which is delimited from the one region or the subset of regions of the first operating surface section by one continuous structural element or by a plurality of individual structural elements.

5. The vehicle according to claim 1, wherein the haptic actuator is configured, in the first operating mode, to have the second haptic effect on the finger which, in combination with the first haptic effect, produces a resulting haptic effect in the finger which unambiguously allows a fact of the finger touching or passing over the structural element to be deduced.

6. The vehicle according to claim 1, wherein each structural element of the one or more structural elements is configured not to obstruct a touch input by touching or passing over the plurality of regions.

7. The vehicle according to claim 1, wherein each region of the plurality of regions is individually illuminable.

8. The vehicle according to claim 1, further comprising:
a transverse element which is mountable in the vehicle rotatably about a steering axis of the vehicle; and
a second steering unit having a second handle for at least one-handed actuation of the steering device by the user steering the vehicle; wherein:
the first steering unit is arranged at a first end of the transverse element and the second steering unit is arranged at a second end of the transverse element;
the first steering unit and the second steering unit are arranged mirror-symmetrically in relation to a plane of symmetry of the steering device, the plane of symmetry containing the steering axis;
each of the first steering unit and the second steering unit is arranged in a manner mounted on the transverse element rotatably about a respective rotation axis.

9. The vehicle according to claim 1, wherein:
when the operating device is in the first operating mode, exactly one region of the plurality of regions is assigned to a first function, and the first function is operable only by touching or passing over the exactly one region; and
when the operating device is in the second operating mode, a subset of the plurality of regions are assigned to a second function, and the second function is operable by touching or passing over at least one of the subset of the plurality of regions.

10. The vehicle according to claim 9, wherein at least two of the subset of the plurality of regions assigned to the second function are adjacent.

11. The vehicle according to claim 9, wherein a region of a second operating surface section and at least one region of a first operating surface section are assigned to the second function; and
the multifunction unit is configured to put the operating device into the second operating mode before performing the second function.

12. The vehicle according to claim 11, wherein the first function comprises one of the following:
inputting of characters,
a scroll gesture using the at least one finger,
a swipe gesture using the at least one finger, or
a zoom gesture using two fingers.

13. The vehicle according to claim 9, wherein individual or all regions of the multiplicity of regions are individually illuminable, and an illumination of each illuminable region depends on an function assigned to the illuminable region.

* * * * *